(No Model.)
A. O. PAYNE.
CHECK HOOK.
No. 423,178. Patented Mar. 11, 1890.
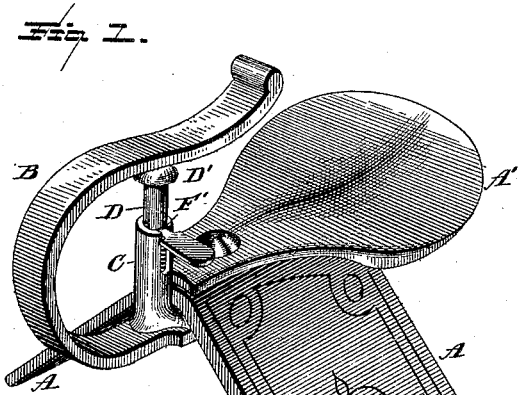
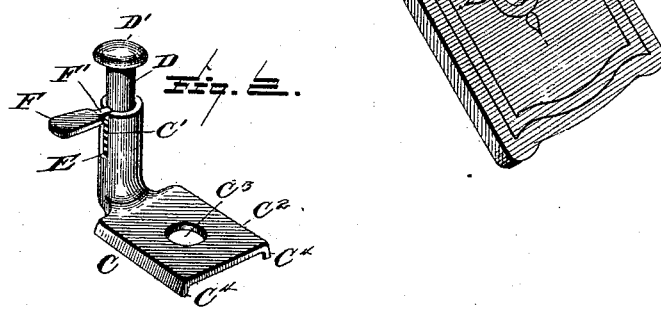
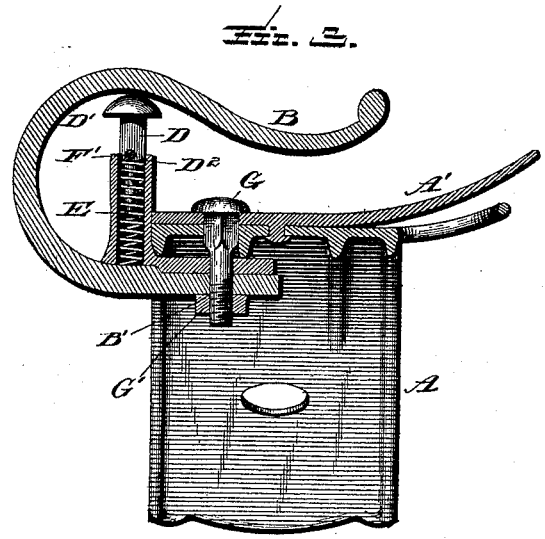
Witnesses
L. C. Hills
H. Sutherland
Inventor
A. O. Payne
By E. B. Stocking
Attorney.

United States Patent Office.

ALEXANDER O. PAYNE, OF ELMIRA, NEW YORK.

CHECK-HOOK.

SPECIFICATION forming part of Letters Patent No. 423,178, dated March 11, 1890.

Application filed June 8, 1889. Serial No. 313,563. (No model.)

*To all whom it may concern:*

Be it known that I, ALEXANDER O. PAYNE, a citizen of the United States, residing at Elmira, in the county of Chemung, State of New York, have invented certain new and useful Improvements in Check-Terrets, of which the following is a specification, reference being had therein to the accompanying drawings.

This invention has relation to checkrein-hooks, the main object of the invention being the provision of a checkrein-hook which can be quickly and easily operated either automatically or by hand, and when the checkrein is in place be held securely therein and prevented by my improvements from being withdrawn.

Another object is that the invention is easy of manufacture, thus necessarily making it capable of production at a minimum cost.

Other objects and advantages of the invention will appear in the following description, and the novel features thereof will be particularly pointed out in the claims.

Referring to the drawings, Figure 1 is a perspective of a checkrein provided with improvements constructed in accordance with my invention. Fig. 2 is a detail hereinafter referred to, and Fig. 3 is a longitudinal section of Fig. 1.

Like letters of reference refer to like parts in all the figures of the drawings.

A represents the saddle-trees, which are provided with upholstering material (not shown) and usual attachments and saddle A', all being of the ordinary well-known construction, said saddle-tree and saddle being slotted for a purpose hereinafter made apparent.

B is the checkrein-hook, which is U-shaped, and extends upwardly and rearwardly a sufficient distance and is apertured in its base, as at B'.

C is the casing, which is open at one end and provided with the recess C', and extending from the casing is the base $C^2$, which is perforated, as at $C^3$, and provided with the downwardly-extending flanges $C^4$. The casing C is adapted to receive the bolt D, which reciprocates freely therein, and is of a length shorter than the casing. The bolt D is shouldered, as at $D^2$, and has a rounded head D'.

E is a spiral or other spring, one end of which rests on the checkrein-hook, the opposite end thereof pressing against the shoulders $D^2$, formed on the bolt D.

F is a thumb-piece, which extends from the bolt and is preferably formed as a part thereof, and is made smaller, as at F', so that it can be slid freely within the groove C', formed in the casing C.

It is apparent that the casing C and its attachments, as shown in Fig. 2, may be cast in one piece, thereby lessening materially the cost of manufacture. The base $C^2$ of the casing C is then placed on the checkrein-hook, the flanges $C^4$ holding the same thereon and free from sideward movement. The perforation formed in the base of the casing C is adapted to register with those formed in the saddle, saddle-tree, and hook of the checkrein. The bolt G is then passed through the several perforations and the nut G' screwed tightly in place, thereby, in connection with the lugs $C^4$, formed on the base $C^2$ of the casing C, holding said casing securely in place.

It is apparent that the shoulder F and its connection F' may be entirely dispensed with, thereby obviating also the provision of a recess in the casing C without departing from the spirit of the invention, and therefore I do not limit myself in this particular, because the rein may be pressed against the round head of the bolt D, thereby pressing the same downward and the rein into position, where it is securely held from withdrawal.

What I claim is—

1. The combination, with the check-hook and saddle, of a cylindrical bolt-receiving casing having a base resting upon and secured to the check-hook beneath the saddle, and a spring-actuated bolt within said casing provided with a thumb-piece, substantially as shown and described.

2. The combination of the saddle-trees A, saddle A', hook B, the casing C, having the flanged and perforated base $C^2$, bolt D, reciprocating in the casing C and having shoulders $D^2$, spring E, pressing against said shoulders, and bolt G, passed through perforations formed in the saddle, saddle-trees, hook, and nut G', substantially as specified.

3. The combination, with the check-hook and saddle, of the cylindrical casing having a base $C^2$, having central aperture and extending flanges $C^4$, embracing the check-hook, of the vertical bolt G, securing said saddle, casing, and check-hook together, and the spring-actuated bolt within the cylindrical portion of the casing and provided with a lateral thumb-piece F, substantially as shown and described.

In testimony whereof I affix my signature in presence of two witnesses.

ALEXANDER O. PAYNE.

Witnesses:
RALPH W. MORRISON,
JOE McLAUGHLIN.